(12) United States Patent
Behroozi et al.

(10) Patent No.: US 8,134,961 B2
(45) Date of Patent: Mar. 13, 2012

(54) ADAPTIVELY CAPPING DATA THROUGHPUT OF CLIENT DEVICES ASSOCIATED WITH A WIRELESS NETWORK

(75) Inventors: Cyrus Behroozi, Menlo Park, CA (US); Frederick Dean, Sunnyvale, CA (US); Ramanagopal Vogety, Milpitas, CA (US); Huizhao Wang, San Jose, CA (US); Mukesh Gupta, Milpitas, CA (US); Saar Gillai, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/088,373

(22) Filed: Apr. 17, 2011

(65) Prior Publication Data

US 2011/0188402 A1   Aug. 4, 2011

Related U.S. Application Data

(62) Division of application No. 11/731,408, filed on Mar. 30, 2007, now Pat. No. 7,957,337.

(51) Int. Cl.
*H04W 4/00*   (2009.01)

(52) U.S. Cl. ...................................................... 370/328
(58) Field of Classification Search .................. 370/328
See application file for complete search history.

(56) References Cited

U.S. PATENT DOCUMENTS

| | | | |
|---|---|---|---|
| 5,062,035 A | 10/1991 | Tanimoto et al. | |
| 6,678,252 B1 * | 1/2004 | Cansever | ...................... 370/253 |
| 6,785,542 B1 | 8/2004 | Blight et al. | |
| 7,046,651 B2 | 5/2006 | Terry | |
| 7,110,753 B2 | 9/2006 | Campen | |
| 7,489,651 B2 | 2/2009 | Sugaya et al. | |
| 2004/0203474 A1 | 10/2004 | Miller et al. | |
| 2004/0261101 A1 | 12/2004 | Iwamura | |
| 2006/0140112 A1 | 6/2006 | Ginzburg | |
| 2006/0215556 A1 | 9/2006 | Wu et al. | |
| 2008/0151751 A1 * | 6/2008 | Ponnuswamy et al. | ........ 370/232 |

* cited by examiner

*Primary Examiner* — Marivelisse Santiago Cordero
(74) *Attorney, Agent, or Firm* — Brian R. Short

(57) ABSTRACT

A methods and apparatuses of adaptively capping data throughput of client devices associated with a wireless network are disclosed. One method includes monitoring an air-time per bit efficiency of each client device associated with the wireless network. A data throughput cap for each client device is adaptively determined based on the air-time per bit efficiency of the client device.

10 Claims, 4 Drawing Sheets

---

Monitoring an air-time per bit efficiency of each client device associated with the wireless network

310

↓

Adaptively determining a data throughput cap for each client device based on the air-time per bit efficiency of the client device

320

ADAPTIVELY CAPPING DATA THROUGHPUT OF CLIENT DEVICES ASSOCIATED WITH A WIRELESS NETWORK

RELATED APPLICATIONS

This patent application is a divisional application of U.S. patent application Ser. No. 11/731,408 filed on Mar. 30, 2007.

FIELD OF THE INVENTION

The invention relates generally to wireless communications. More particularly, the invention relates to methods and apparatuses for adaptively capping data throughput of client devices associated with wireless networks.

BACKGROUND OF THE INVENTION

Wireless networks include wireless links that can be susceptible to interference. Wireless mesh networks typically include many wireless links, and therefore, can be particularly susceptible to interference. One form of interference is self interference, in which a wireless link within the wireless mesh network receives interfering signals from other wireless links of the wireless mesh network. As packets are relayed through the wireless mesh network, they can suffer from the effects of self-interference, or they may cause interference for other links within the wireless mesh network.

The self-interference can limit the air-time availability to nodes of a wireless network. That is, the self-interfering signals of a node within a wireless network occupy transmission air-time, thereby limiting the transmission air-time available to other nodes of the wireless network. Nodes that have poor quality wireless links can be particularly problematic because they typically require low-order modulation formats, and packet re-transmissions. Lower order modulation formats and re-transmissions both cause the air-time per bit efficiency to drop, resulting in the occupation of more air-time.

A proposed method of limiting interference in a wireless network is to place a fixed cap on the data throughput of all client devices connected to the wireless network. This is an undesirable method because placing fixed caps on the data throughput of all client devices limits the throughput of a client device even if the client device is not causing excess interference within the wireless network.

It is desirable to control self-interference within a wireless network. It is additionally desirable that the self-interference control not overly burden or restrain a device of the wireless network when the device is not substantially contributing to self-interference within the wireless network.

SUMMARY OF THE INVENTION

An embodiment of the invention includes a method of controlling transmission air-time available to a wireless node within a wireless network. The method includes the wireless node monitoring air-time available to the wireless node for wireless transmission. The wireless node controls wireless transmission of neighboring wireless devices if the air-time available is detected to be lower than a threshold.

Another embodiment of the invention includes a method of adaptively capping data throughput of client devices associated with a wireless network. The method includes monitoring an air-time per bit efficiency of each client device associated with the wireless network. A data throughput cap for each client device is adaptively determined based on the air-time per bit efficiency of the client device.

Other aspects and advantages of the present invention will become apparent from the following detailed description, taken in conjunction with the accompanying drawings, illustrating by way of example the principles of the invention.

DETAILED DESCRIPTION

The invention includes a method and apparatus for controlling air-time utilization of a wireless network. The air-time utilization can be controlled by access nodes of the wireless network sensing an air-capacity problem, and controlling data throughput, and therefore, air-time utilization. The air-time utilization can also be controlled by adaptively setting data throughput caps on client devices connected to the wireless network. The data throughput caps can be adaptively set and/or adjusted depending upon the amount of air-time available.

The following embodiment and descriptions are directed to wireless mesh networks. However, it is to be understood that the embodiments described are not limited to wireless mesh networks. Wireless networks in general can benefit from the methods of controlling transmission air-time described.

Figure 1:
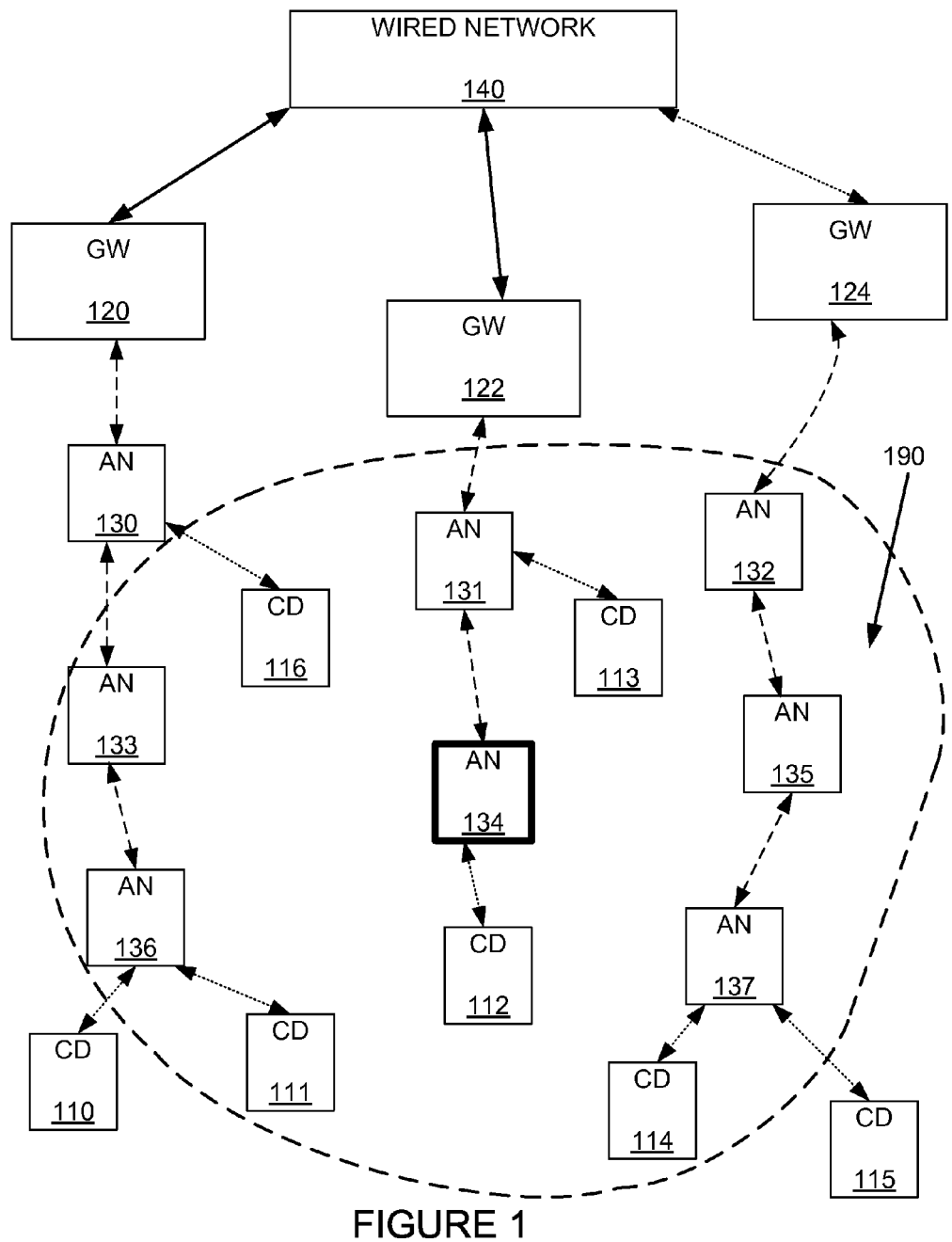
FIG. 1 shows an example of a wireless mesh network that can utilize methods of controlling transmission air-time available to nodes within the wireless mesh network.

FIG. 1 shows an example of a wireless mesh network that includes gateways 120, 122, 124, access nodes 130-137 and client devices 110-116. The wireless access nodes interconnect with each other, and with gateways 120, 122, 124 to form a mesh. The interconnections are wireless links, and therefore, the air-time occupied by wireless links of each of the access nodes 130-137 and client device 110-116 is important because there is only a finite amount of air-time available. Depending upon the physical locations of the access nodes, certain access nodes are more likely to interfere with other nodes of the wireless network. Neighbor nodes can be defined as other nodes that can receive signals from a node, wherein the received signals have a predetermined amount of signal strength. Neighboring nodes can be a source of self-interference, and can cause the air-time available to a node to fall below desirable levels.

The exemplary wireless mesh network of FIG. 1 includes the three gateways 120, 122, 124. Each gateway 120, 122, 124 defines a cluster. For example, a first cluster of the gateway 120 includes access nodes 130, 133, 136. A second cluster of the gateway 122 includes access nodes 131, 134. A third cluster of the gateway 124 includes the access nodes 132, 135, 137.

The access nodes 130-137 form routing paths through the wireless mesh network. Client devices 110-116 wirelessly connect to any one of the gateways 120, 122, 124 or access nodes 130-137 to obtain a data path to the wired network 140.

Air-time is occupied when client devices 110-116 are connected to the wireless mesh network. The time occupied by each client device connection is generally not equal. That is, the air-time occupied can vary greatly from client device to client device. Generally, the air-time occupied by a client device is dependent upon the quality of the links between the client device and the gateway the client device is routed to, and the number of wireless hops between the client device and the gateway. The more wireless hops a link is away from a gateway, the greater the effect a link can have on the available air-time capacity.

Poor link quality affects the air-time occupied by signals transmitted through the link because poor links typically require the signals to have lower-order modulation formats. Therefore, the amount of air-time occupied per bit goes down. Additionally, poor quality links typically require more re-transmissions, which also increases the air-time occupied per bit. If a poor link is located several hops downstream from a gateway, all of the links between the gateway and the client device operating on the same or overlapping frequency additionally occupy air-time as dictated by the last link to the client device.

As shown in FIG. 1, a range 190 exists around an access node (such as access node 134) in which wireless links within this range 190 can reduce the air-time available to the access node 134. Medium access protocols such as 802.11 implement Carrier Sense Multiple Access with Collision Avoidance (CSMA/CA). In such protocols, transceivers sense a channel (link) and defer transmissions while the channel is considered to be busy. The channel is deemed to be busy if a received signal exceeds a Clear Channel Assessment Threshold (CCAT). Once the CCAT has been tripped, the nodes can no longer transmit any signals. Therefore, if the access node 134 is receiving transmission signals from at least one of the wireless links within the reception range, the access node 134 may be unable to either receive or transmit signals. As such, at some point the available air-time can become so limited that the access node 134 cannot properly operate within the wireless mesh network.

The embodiments of controlling air-time include sensing an air-time availability problem, and taking steps to reduce the problem. Other embodiments include taking steps to help ensure that air-time availability problems don't occur. As previously described, it is undesirable to artificially limit the air-time and data throughput of all client devices, whether the client devices are occupying excessive air-time or not.

Figure 2:
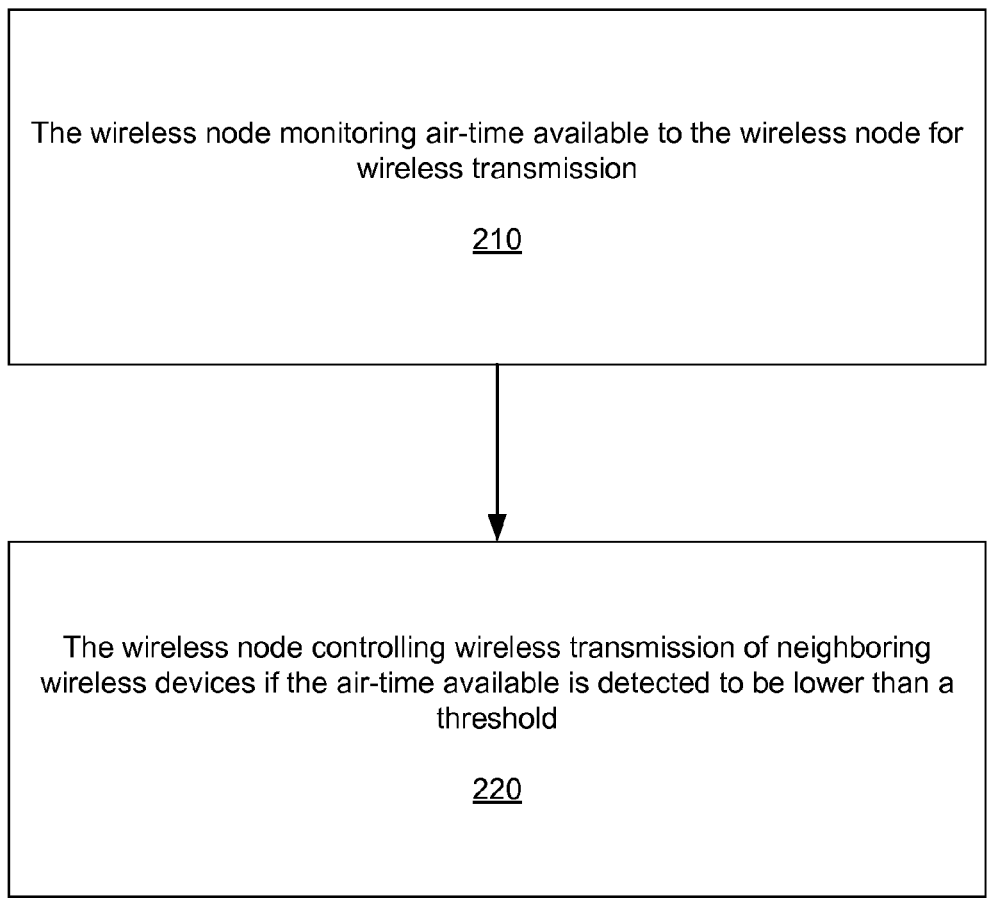
FIG. 2 is a flow chart that includes steps of an example of a method of controlling transmission air-time available to a wireless node within a wireless network.

FIG. 2 is a flow chart that includes steps of an example of a method of controlling transmission air-time available to a wireless node within a wireless network. A first step 210 includes the wireless node monitoring air-time available to the wireless node for wireless transmission. A second step 220 includes the wireless node controlling wireless transmission of neighboring wireless devices if the air-time available is detected to be lower than a threshold.

If the node is a single wired access point, the neighboring wireless devices are the client devices, and the air-time can be controlled by controlling air-time utilization of the client devices. This can include dropping packets to or from the client device. For multiple wired access points, the neighboring devices can include other wired access points and client devices. Wireless mesh networks will be described later.

Each access node of the wireless network can monitor whether the air-time available is detected to be lower than a threshold, or an air-time metric above a threshold. Once an access node determines that it does not have enough available air-time, the access node controls its neighboring nodes to free up air-time. If air-time is detected as occupied, the access node can not transmit data. If air-time is not occupied, the access node is unencumbered, and free to transmit data.

Several different methods can be used to identify the neighboring devices of a given access node of a wireless network. As previously stated, the neighboring devices are wireless devices that the access node can receive signals from when the neighboring device is transmitting data signals. One method of identifying the neighboring devices includes the access node broadcasting a control signal. All wireless devices that receive the control signals are by default designated as neighboring devices. As will be described, one type control signal includes an air-time cap request. All devices that receive the broadcast air-time cap request are neighboring devices, and the neighboring devices are to cap the air time of client devices that route through the neighboring devices as specified by the air-time cap request.

For another embodiment, the neighboring devices are identified by the wireless node by analyzing record identifiers of devices that the wireless node receives packets from. It can be assumed that since the wireless node is able to receive the packets, the transmission by the transmitting node is limiting air-time availability of the wireless node. Once the neighboring devices are known, the wireless node can control the neighboring devices through uni-casts directed to the neighboring nodes, or through the network itself.

Generally, a first step to controlling wireless transmission of neighboring wireless devices includes communicating to the neighboring wireless devices to reduce air-time occupied by the neighboring wireless devices. The air-time occupied by each neighboring wireless device can be limited by reducing data throughput of each client device that routes data traffic through each neighboring wireless device.

One method of controlling wireless transmission of neighboring wireless devices includes communicating to the neighboring wireless devices to put a cap on data throughput of each client devices that routes through each of the neighboring devices. The cap on data throughput can be fixed for all client devices of the neighboring devices, or the cap on data throughput can be tailored to each client device depending upon the efficiency (order of modulation and the fraction of transmissions that require resends) of each client device.

As mentioned, the cap on the data throughput can be fixed for all client devices of the neighboring devices. One method includes capping data throughput of the neighboring devices. More specifically, this includes capping the client connected to the neighboring devices. Another method includes capping data throughput of all nodes of clusters that include the neighboring devices. More specifically, this includes capping data throughput of all client devices that are attached to the clusters of the neighboring devices.

The capping can be tailored to each client devices by setting the data throughput cap based on a data rate of transmission of links associated with each client device, and packet success rate of the transmission of links associated with each client device. The lower the data rate, typically, the greater the air-time occupied per bit. The packet success rate can provide an estimate of the link quality, which as previously described, also can reflect air-time occupied per bit. Therefore, both data rate and packet success rate provide an indication of the air-time occupied per bit, and therefore, are useful for setting a cap on the data throughput of the client devices.

As previously described, the wireless mesh network can be more likely to have air-time capacity problems because of the relatively close proximity of a large number of wireless links. For wireless mesh networks, an embodiment includes determining a cap on the data throughput for each client devices based a data rate of each link, and a packet success rate of each link of a data path between the client device and a gateway of wireless mesh network. Generally, the hop count (number of wireless hops away from a gateway) affects the air-time occupied by each client device. It should be noted that clusters can be implemented using a single transmission channel, or multiple transmission channels. Clearly, links of a cluster that operate on a different transmission channel will not have nearly the impact and link of the cluster that operate on the same transmission channel as the transmitting node. Links operating on a non-overlapping transmission channels typically have minimal or zero impact on the air-time availability of the transmitting node.

In some situations it can make sense to remove or re-evaluate a data throughput cap that has been set. One embodiment includes timing out the cap after a predetermined period of time, and renewing it if the air-time available continues to be detected to be lower than the threshold. Another embodiment includes eliminating the cap if the available air-time is detected to be above a second threshold.

In some situations, setting caps on client devices will not improve the air-time available to a node because the air-time is being occupied by devices that are not associated with the network, and therefore, can not be controlled. Therefore, an embodiment includes detecting how much air-time is occupied by non-neighbor device (a device that cannot be controlled) interfering signals. If the air-time occupied by a non-neighboring device interfering signal is a threshold amount greater than air-time occupied by neighboring devices, then data throughput of client devices of the neighboring devices is not capped.

Adaptively Capping Data Throughput of Client Devices

Figure 3:
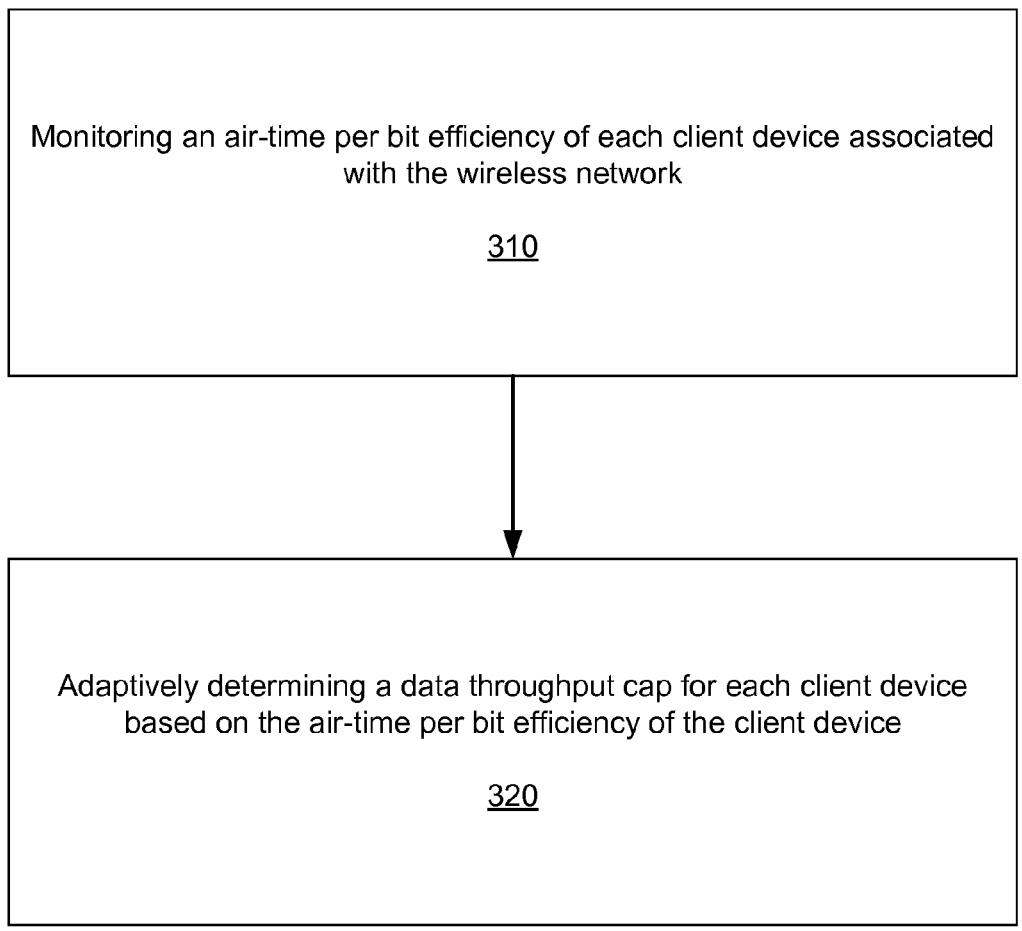
FIG. 3 is a flow chart that includes steps of an example of a method of adaptively capping data throughput of client devices associated with a wireless network.

FIG. 3 is a flow chart that includes steps of an example of a method of adaptively capping data throughput of client devices associated with a wireless network. A first step 310 includes monitoring an air-time per bit efficiency of each client device associated with the wireless network. A second step 320 includes adaptively determining a data throughput cap for each client device based on the air-time per bit efficiency of the client device.

For a single wired access point, the adaptive data throughput cap can be applied to client devices connected to the single wired access point. For multiple wired access points, the adaptive data throughput cap can be applied to client devices of each of the wired access points. For a wireless mesh network, the adaptive data throughput cap can be applied to client devices connected to each of the nodes of the wireless mesh network.

The air-time per bit efficiency can generally be determined from the data rate, the order of modulation, and the number of retries. Generally, the lower the quality of a wireless link, the lower the order of modulation, and the greater the number of retries required to transmit over a link. Therefore, the lower the quality of the wireless link, the lower the air-time per bit efficiency of the wireless link.

For one embodiment, the data throughput caps are adaptively set whether there is an air-time capacity problem or not. Another embodiment includes only adaptively setting the data throughput caps when an air-time capacity problem is detected. That is, nodes of the wireless network monitor air-time availability, and adjust the data throughput cap on neighboring wireless devices if the air-time availability falls below a threshold. More specifically, data throughput of each client device is capped only if data transmission of links associated with the client device cause a neighboring access node to trigger an air-time threshold that indicates that the neighboring access node has only a threshold amount of air-time available for data transmission.

An embodiment includes setting the value of the cap (air-time or data throughput) based level or degree in which the available air-time is occupied. For example, if the air-time availability is 25%, one cap value is selected, whereas if the air-time availability is 20%, a different cap value is selected. Alternatively or additionally, a time the air-time availability is exceeded can be used to select the cap. For example, if the air-time availability is detected at 25%, a first cap value can be selected. If the air-time availability is still 25% after a period of time (for example, five minutes) a second cap value can be selected.

A data throughput cap can be adaptively determined for each client device based on the air-time per bit efficiency of the client device further by determining the data throughput cap based on transmission data rates of links associated with the client device, a number of hops associated with the client device, and a probability of successful transmission of data packets of the client device.

The air-time per bit efficiency of each client device can be determined by analyzing data rates of links associated with the client device and a number of wireless hops associated with the client device. As previously described, the air-time per bit of transmission data is influenced by both of these factors.

Another embodiment further includes gateways of the wireless network capping in-bound data traffic to the wireless network. Capping certain types of data traffic at the edge of a network can help prevent or reduce air-time use of a wireless network. For example, it can be useful to limit UDP data traffic at the edge of the wireless network.

Figure 4:
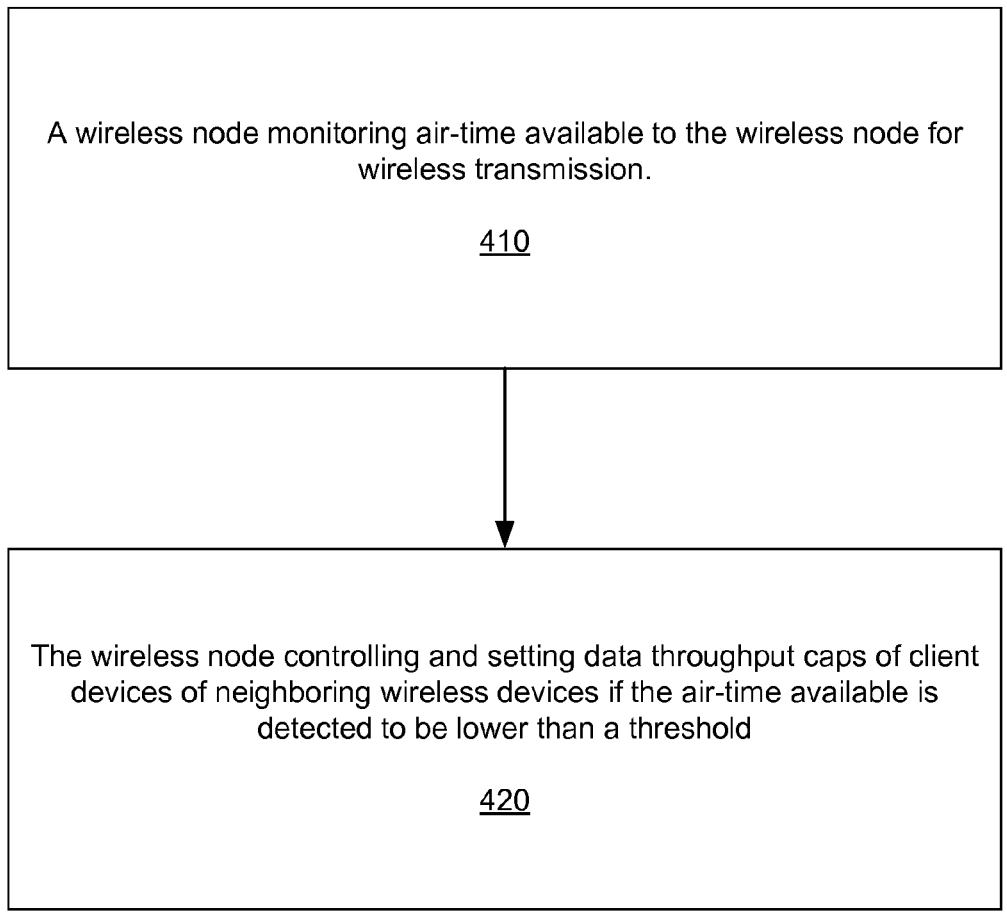
FIG. 4 is a flow chart that includes steps of an example of a method of sensing an air-time problem, and adaptively capping data throughput of client devices associated with a wireless network.

FIG. 4 is a flow chart that includes steps of an example of a method of sensing an air-time problem, and adaptively capping data throughput of client devices associated with a wireless network. A first step 410 includes a wireless node monitoring air-time available to the wireless node for wireless transmission. A second step 420 includes the wireless node controlling and setting data throughput caps of client devices of neighboring wireless devices if the air-time available is detected to be lower than a threshold.

Although specific embodiments of the invention have been described and illustrated, the invention is not to be limited to the specific forms or arrangements of parts so described and illustrated. The invention is limited only by the appended claims.

What is claimed:

1. A method of adaptively capping data throughput of client devices associated with a wireless network, comprising:
   monitoring an air-time per bit efficiency of each client device associated with the wireless network;
   adaptively determining and selecting a data throughput cap from a plurality of data throughput caps for each client device based on the air-time per bit efficiency of the client device;
   wherein the air-time per bit efficiency is determined from a data rate, an order of modulation and a number of retries; and
   further comprising determining the data throughput cap based on transmission data rates of links associated with the client device, a number of hops associated with the client device, and a probability of successful transmission of data packets of the client device.

2. The method of claim 1, wherein multiple air-time bit efficiency thresholds determine which of the plurality of data throughput caps are selected.

3. The method of claim 1, wherein nodes of the wireless network monitor air-time availability, and adjust the data throughput cap on neighboring wireless devices if the air-time availability falls below a threshold.

4. The method of claim 1, wherein data throughput of each client device is capped only if data transmission of links associated with the client device cause a neighboring access node to trigger an air-time threshold that indicates that the neighboring access node has only a threshold amount of air-time available for data transmission.

5. The method of claim 1, further comprising gateways of the wireless network capping in-bound data traffic to the wireless network.

6. A wireless network adapted to cap data throughput of client devices associated with the wireless network, the wireless network comprising a plurality of access nodes, comprising:
   each access nodes configured to monitor an air-time per bit efficiency of each client device associated with the wireless network;
   each access nodes configured to adaptively determine and select a data throughput cap from a plurality of data throughput caps for each client device based on the air-time per bit efficiency of the client device;
   wherein the air-time per bit efficiency is determined from a data rate, an order of modulation and a number of retries; and further comprising determining the data throughput cap based on transmission data rates of links associated with the client device, a number of hops associated with the client device, and a probability of successful transmission of data packets of the client device.

7. The wireless network of claim 6, wherein multiple air-time bit efficiency thresholds determine which of the plurality of data throughput caps are selected.

8. The wireless network of claim 6, wherein each of the plurality of wireless access nodes of the wireless network monitor air-time availability, and adjust the data throughput cap on neighboring wireless devices if the air-time availability falls below a threshold.

9. The wireless network of claim 6, wherein data throughput of each client device is capped only if data transmission of links associated with the client device cause a neighboring access node to trigger an air-time threshold that indicates that the neighboring access node has only a threshold amount of air-time available for data transmission.

10. The wireless network of claim 6, further comprising gateways capping in-bound data traffic to the wireless network.

* * * * *